United States Patent

[11] 3,610,277

| | | |
|---|---|---|
| [72] | Inventor | Clarence E. Smith, Jr.<br>Johnsville, Md. |
| [21] | Appl. No. | 867,649 |
| [22] | Filed | Oct. 20, 1969 |
| [45] | Patented | Oct. 5, 1971 |
| [73] | Assignee | The United States of America as represented by the Secretary of the Army |

[54] PRESSURE-ACTUATED FLOW REGULATOR
4 Claims, 3 Drawing Figs.

[52] U.S. Cl. .................................................... 137/505.13, 251/58
[51] Int. Cl. .................................................. F16k 31/12
[50] Field of Search ........................................ 137/505.13; 251/250, 58; 222/61

[56] References Cited
UNITED STATES PATENTS

| 1,958,262 | 5/1934 | Boland | 251/250 X |
| 2,955,614 | 10/1960 | Meynig | 137/505.13 |
| 2,912,215 | 11/1959 | Forrester | 251/250 X |

*Primary Examiner*—Stanley H. Tollberg
*Attorneys*—Harry M. Saragovitz, Edward J. Kelly, Herbert Berl and S. Dubroff ABSTRACT: A pulse-type generator system that has a pressure-actuated flow regulator for improved flow of a gradually depleting fluid from a predetermined closed source to be utilized in dispensing material intermittently. As the pressure fluid supply approaches depletion and the fluid flow volume per pulse tends to lessen, the control regulator assures maximum pressure fluid delivery per pulse or unit of time as required to the energy absorbing pulse generator. The flow regulator has a rack and pinion drive unit for a rotary valve positioned in the energy fluid supply line. The controlling rack is actuated by a piston arrangement that is responsive to the gradual depletion of the closed supply of pressure fluid or energy.

PATENTED OCT 5 1971

INVENTOR,
CLARENCE E. SMITH, JR.
BY: *Harry M. Saragovitz,*
*Edward J. Kelly, Herbert Berl &*
*S. Dubroff* ATTORNEYS.

PRESSURE-ACTUATED FLOW REGULATOR

The invention described herein may be manufactured, used, and licensed by or for the Government for governmental purposes without the payment to me of any royalty thereon.

The invention relates to a flow regulator and, more particularly, to a pressure-actuated flow regulator for improved flow control of a gradually depleting pressure fluid from a predetermined closed source.

In a pulse-type generator system in which material is dispensed intermittently and the generator source of energy is a closed cylinder of pressure gas, the volume of gas per pulse becomes continuously less as the gas supply approaches depletion. As a result, a continuously diminishing quantity of material is dispensed.

It is an object of the invention to provide such a generator system with a flow regulator that will improve the system operation and efficiency.

Another object of the invention is to provide the system with a control regulator that assures maximum energy or pressure gas delivery.

These and other objects, features and advantages will become more apparent from the following description and accompanying drawings in which.

Figure 1:
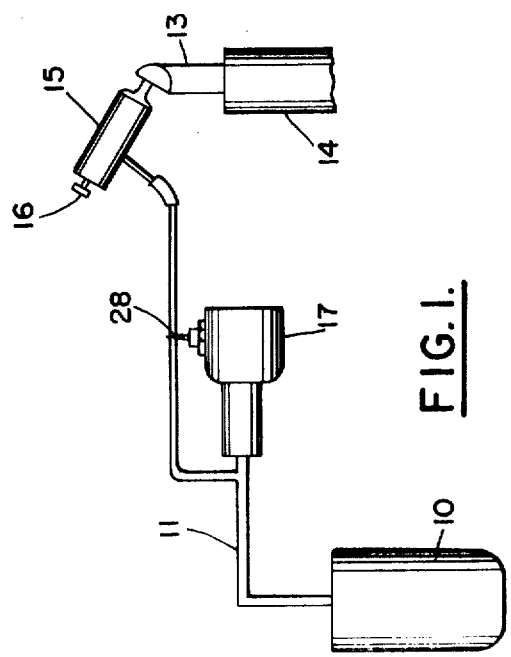
FIG. 1 is a schematic view, partly broken away, of a pulse-type generator system embodying a flow control regulator and embracing the principles of the invention.

The pulse-type generator system has an energy source in the form of a closed tank or cylinder 10 (FIG. 1) that is preferably filled with nitrogen gas to an initial pressure of 1,800 p.s.i. by means (not shown). Suitable conduits 11, 12 fluidly connect the pressure gas source 10 with an accumulator 13 of a piston pulser 14 through an appropriate T-shaped coupling 15 having a valve control 16 for adjusting changes in the system pulse rate.

Figure 3:
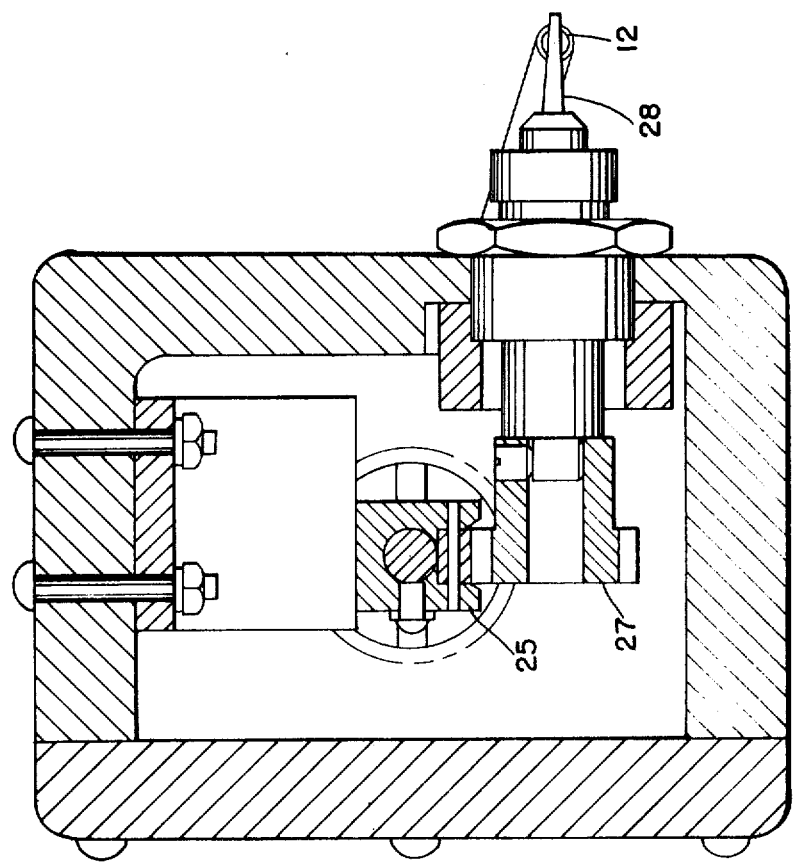
FIG. 3 is a sectional view taken along line 3—3 of FIG. 2.
Figure 2:
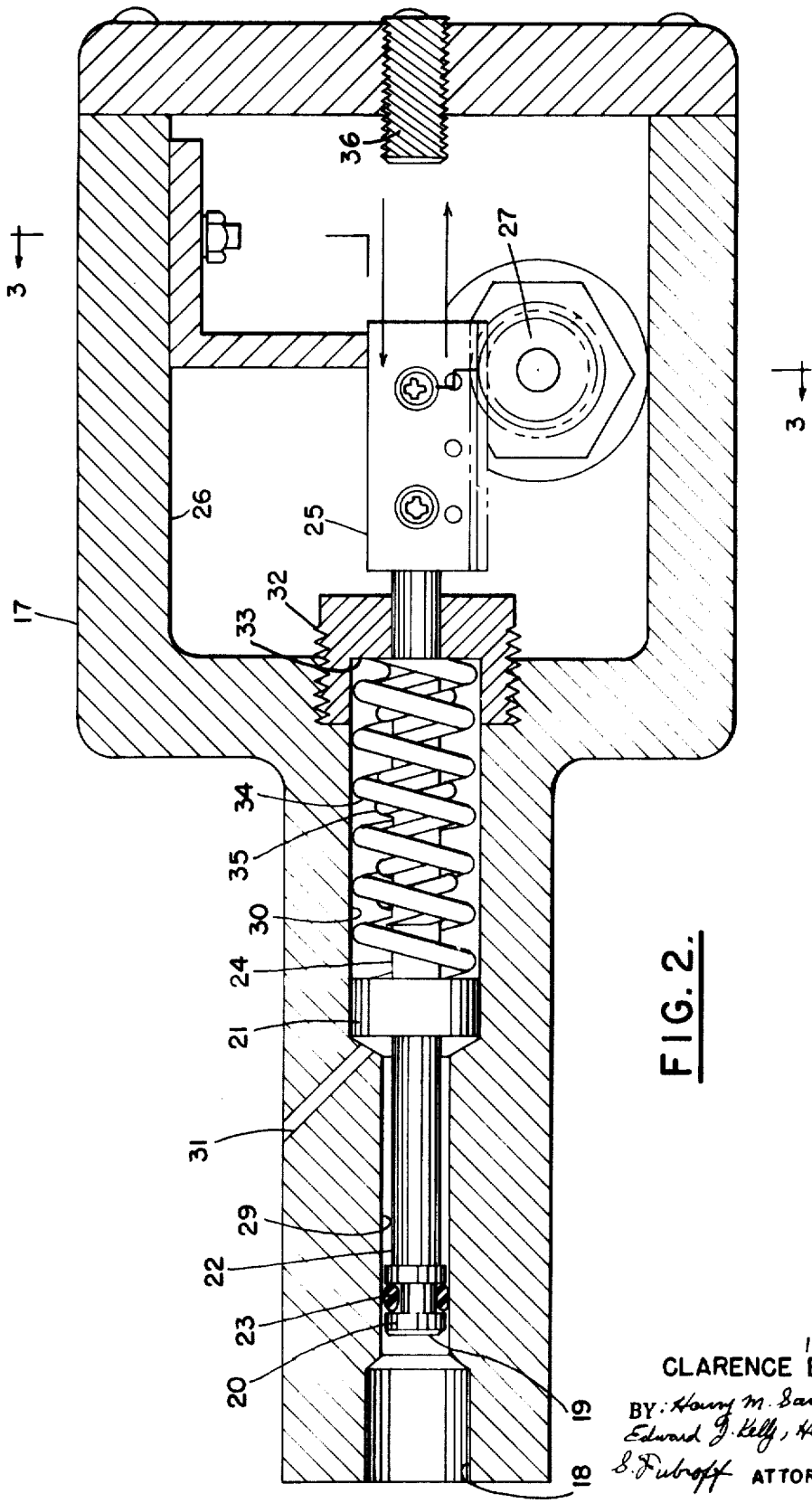
FIG. 2 is a longitudinal sectional view of the flow control regulator employed in the FIG. 1 arrangement.

The pressure-actuated flow control regulator 17 has a body provided at one end thereof with an inlet port 18 (FIG. 2) suitably tapped to facilitate fluid communication between conduit 11 and the end or head 19 of one of a longitudinally spaced pair of piston members 20, 21 that are interconnected by rod 22. Piston member 20 carries an O-ring seal to preclude fluid leakage therepast. Piston member 21 is connected by integral rod 24 with a gear rack 25 (FIGS. 2, 3) located in an enlarged chamber 26 of the regulator body to controllingly drive pinion gear 27 that operatively rotates the threadedly advancing or withdrawing tapered pin of rotary valve member 28 which controls the fluid flow therepast in conduit 12 per pulse or unit of time.

The stepped passages 29, 30 in the piston portion of the regulator body slidably receive the piston members 20, 21 and the intermediate atmospheric port 31 in the body facilitates longitudinal reciprocation of the piston unit and rack 25 as limited by the adjustable setscrew or stop 36 threadedly mounted to the body and longitudinally aligned with rack 25. A centrally apertured cup member 32 is threadedly secured to the regulator body interior wall at the juncture of passage 30 and chamber 26. The cup 32 slidably receives piston rod portion 24 and its recessed face 33 provides a set for one end of a heavy piston-biasing spring 34 that normally urges the piston means toward the inlet port 18 to move or rotate the valve member 28 counterclockwise (FIG. 2) toward an open position. A second spring 35, smaller and somewhat shorter than the overlying spring 34, surrounds the piston rod portion 24 and assists the heavy spring 34, when the latter is compressed a predetermined amount by the initially high-pressure nitrogen gas, to barely prevent the high-pressure gas from closing the valve 28. As the pressure in the nitrogen tank is reduced due to system supply or usage, the biasing spring means has sufficient strength to gradually open valve 28, such that a satisfactory supply of pressure gas is available for timed deliveries to the energy absorbing piston pulsing system.

I wish it to be understood that I do not desire to be limited to the exact details of construction shown and described, for obvious modifications will occur to a person skilled in the art.

I claim:

1. A pressure-actuated flow regulator for use in a pulse generator system or the like, comprising
    a regulator body having one end provided with an inlet port adapted for connection to a predetermined pressure gas supply,
    piston means longitudinally slidable in said body,
    a rack movable with said piston means for longitudinal reciprocation within said body,
    a rotary valve having a central axis transverse of and offset from said rack, said valve being adapted for installation in a conduit connected with said pressure gas supply,
    a pinion carried by said valve and in toothed engagement with said rack for operating said valve,
    means normally biasing said piston means toward said inlet port and for moving said valve to an open position, and
    stop means mounted in the other end of said body for abutting said rack, said piston means including a rod interconnecting said rack and a piston member, said biasing means including a threaded cup member secured to said body intermediate said rack and said piston member, said cup having an apertured base slidably receiving said piston rod and a recessed face, and a compression spring seated against said recessed face and piston member, said piston means including a second rod interconnecting said piston member and a second piston member longitudinally spaced therefrom, said second piston member carrying an O-ring seal, said body having an atmospheric port located intermediate said piston members.

2. The structure in accordance with claim 1 wherein said stop means includes an adjustable setscrew threadedly connected to said body, such that selective positioning thereof longitudinally of the motion path of said rack will permit said valve to be driven to a slightly open position by said piston means.

3. In a pulse-type generator system for intermittently dispensing material and having a closed gas pressure source connected by conduit means with a piston pulser unit, said conduit means having a pressure-actuated regulator,
    said regulator having a body with one thereof provided with an inlet port fluidly connected to said source,
    piston means longitudinally slidable in said body,
    a rack movable with said piston means for longitudinal reciprocation within said body,
    a rotary valve having a central axis transverse of and offset from said rack, said valve controlling fluid flow in said conduit means,
    a pinion carried by said valve and in toothed engagement with said rack for operating said valve,
    means normally biasing said piston means toward said inlet port and for moving said valve to an open position, and
    stop means mounted in the other end of said body for abutting said rack, said piston means including a rod interconnecting said rack and a piston member, said biasing means including a threaded cup member secured to said body intermediate said rack and said piston member, said cup having an apertured base slidably receiving said piston rod and a recessed face, and a compression spring seated against said recessed face and piston member, said piston means including a second rod interconnecting said piston member and a second piston member longitudinally spaced therefrom, said second piston member carrying an O-ring seal, said body having an atmospheric port located intermediate said piston members.

4. The structure in accordance with claim 3 wherein said stop means includes an adjustable setscrew threadedly connected to said body, such that selective positioning thereof longitudinally of the motion path of said rack will permit said valve to be driven to a slightly open position by said piston means.